Sept. 17, 1968 M. L. WORTMAN 3,401,607
RECIPROCATING BELLOWS
Filed Aug. 8, 1966 2 Sheets-Sheet 1

INVENTOR
MICHAEL L. WORTMAN
BY
*Irwin C. Alter*
ATTORNEY

Sept. 17, 1968   M. L. WORTMAN   3,401,607
RECIPROCATING BELLOWS
Filed Aug. 8, 1966   2 Sheets-Sheet 2
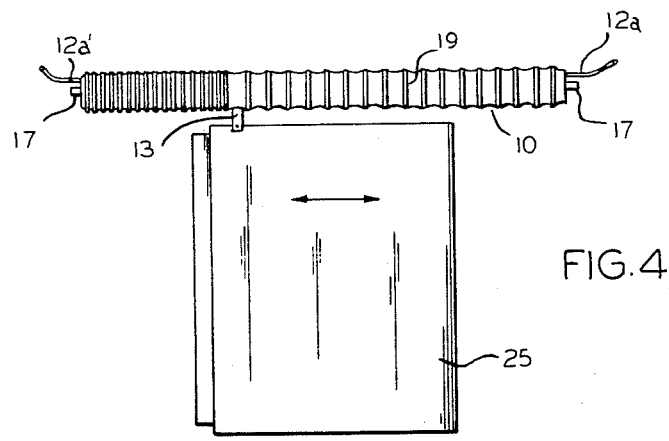
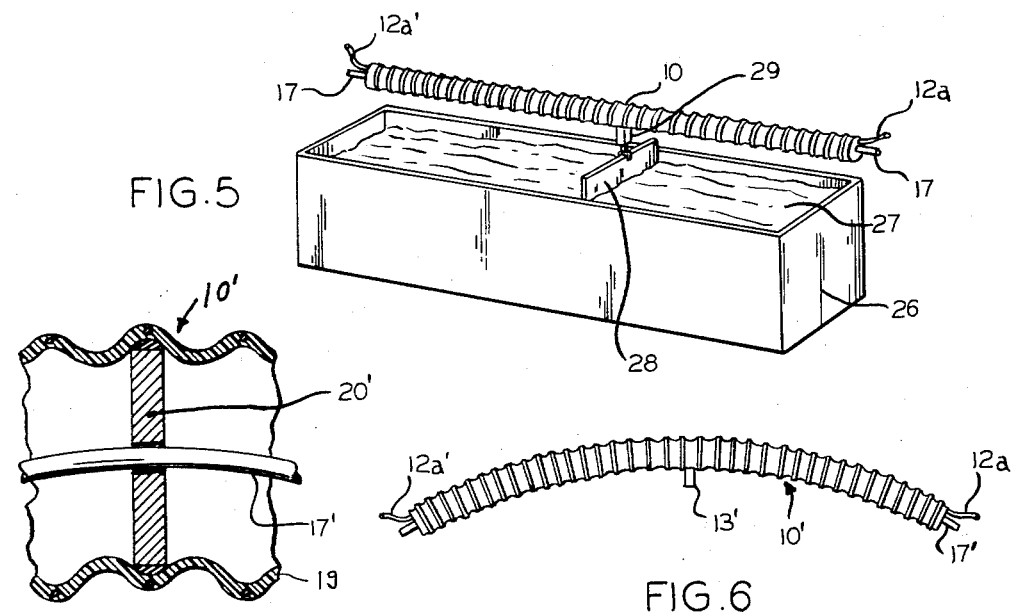
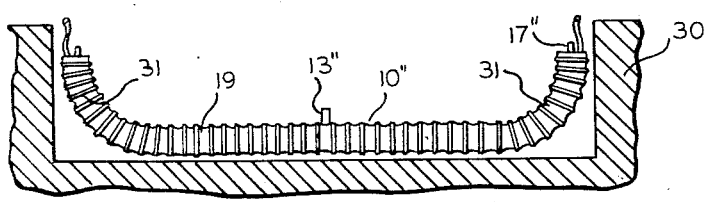
INVENTOR
MICHAEL L. WORTMAN
BY Irwin C. Alter
ATTORNEY

United States Patent Office 3,401,607
Patented Sept. 17, 1968

3,401,607
RECIPROCATING BELLOWS
Michael L. Wortman, 5936 Monroe,
Morton Grove, Ill. 60053
Filed Aug. 8, 1966, Ser. No. 571,048
11 Claims. (Cl. 92—39)

ABSTRACT OF THE DISCLOSURE

Reciprocating bellows includes flexible reciprocating hose having internal guide means for defining the path of travel of the hose. The hose is adapted to have a working unit coupled thereto and fluid pressure selectively introduced within the hose moves the hose and the working unit in either direction along the path of travel.

---

This invention relates to a reciprocating bellows apparatus and is particularly concerned with such an apparatus which produces a large travel for a working unit and is adaptable to confined space. A reciprocating bellows apparatus constructed in accordance with the principles of the present invention is capable of use in many applications such as providing reciprocating motion for a paint spray head used in mass production of painted articles, for opening and closing sliding doors and many other uses.

The present invention is characterized by provision of a guiding member about which is mounted flexible bellows or casings which form at least one closed variable volume chamber. One end of the chamber is fixed while the other end is free to move along the guiding member in response to variations in fluid pressure within the chamber. Fluid pressure means are provided for changing the pressure in the chamber to cause the free end of the chamber to which a working unit, such as, for example, a paint spray nozzle may be affixed, to reciprocate along the guide member.

In one aspect the invention encompasses the use of transversely wire reinforced flexible tubular shaped hose as a bellows; that is, as a longitudinal motion generating member. The flexible tubular shaped hose may be reinforced by a plurality of encased circular wires or by an encircling or enclosed wire coil so as to limit transverse expansion of the hose in the dimension normal to its longitudinal axis. When coil reinforcement is employed the bellows has the property of being biased to return to a normal position.

In one specific embodiment of the invention a guiding member in the form of a single rod may be provided about which is affixed a flexible coil-reinforced plastic hose. Each end of the hose is enclosed in a sealing manner by an end plate which is affixed to the guiding members. A slidable center plate is provided to divide the enclosed plastic tube into two chambers. Fluid pressure means are provided for varying the pressures in the two chambers whereby the slidable member may be caused to move on the guiding member and the coil reinforced plastic tube on one side of the center plate is longitudinally compressed while on the other side of the center plate the tube is longitudinally expanded. Either gas or liquid fluid pressure may be used to operate the bellows.

While fluid pressure-bellows have been employed for activating indicating dials and for other short stroke applications, as, for example, those taught in the United States Letters Patent Number 2,297,900 granted in the name of R. K. Lee on Oct. 6, 1942, for "Pneumatic Motor" or the United States Letters Patent Number 2,080,212 granted in the name of C. A. Otto for "Control Mechanism for Dampers and the Like," these applications were restricted to low-energy and small stroke applications. The present invention is particularly advantageous for long stroke applications. It has the further advantage of being adaptable to many uses, and of being economical to construct, repair and replace.

For reciprocating a working unit the present invention has several advantages over prior art reciprocating apparatus. The present invention has the particular advantages of requiring less machinery and may be made to less demanding tolerances than that required for other reciprocating apparatus of, for example, the piston and cylinder type. Thus the present invention provides a reciprocating apparatus that may be manufactured at a lower cost than prior art alternative, such as piston and cylinder apparatus. Nor does the present invention require lubrication and maintenance to anywhere near the degree normally required of piston and cylinder type reciprocating apparatus.

Another advantage of the present invention over most prior art reciprocating apparatus is the inherent immunity to fouling, jamming, or inefficient operation in "dirty" environments of use. It is often a problem in mechanized paint spraying, for example, that the mechanism moving the spray unit becomes clogged with hardened air-borne paint droplets. This problem requires cleaning of the mechanism frequently, resulting in expensive upkeep and often costly delays in production. The present invention provides solution for the problem of foreign matter, such as paint spray droplets, by providing a reciprocating apparatus in which the surfaces that travel relative to each other are entirely enclosed and hermetically sealed against such matter. Thus the present invention finds ready application to many environments of use in which dust, dirt, and other foreign matter are present, to which other reciprocating apparatus could not be adapted or could be adapted only at excessive costs in repair, maintenance and replacement.

The general object of this invention therefore is to provide a new and improved reciprocating bellows apparatus which is adaptable to many uses, including long stroke uses.

Other more specific objects, advantages and features of this invention will be better understood by reference to the following description of the invention taken in conjunction with the accompanying drawings, in which:

FIG. 4 is an elevational view of a reciprocating bellows apparatus of the present invention in another environment of use;

FIG. 5 is a perspective view illustrating yet another application for the versatile reciprocating bellows apparatus of the present invention;

FIG. 6 is an elevational view of another embodiment of the invention illustrating its adaptability;

FIG. 6A is an enlarged sectional view of a portion of the reciprocating bellows apparatus of FIG. 6; and FIG. 7 is similar view as that of FIG. 6 of yet another embodiment of the present invention adapted for use in an confined area shown in sectional view.

Figure 1:
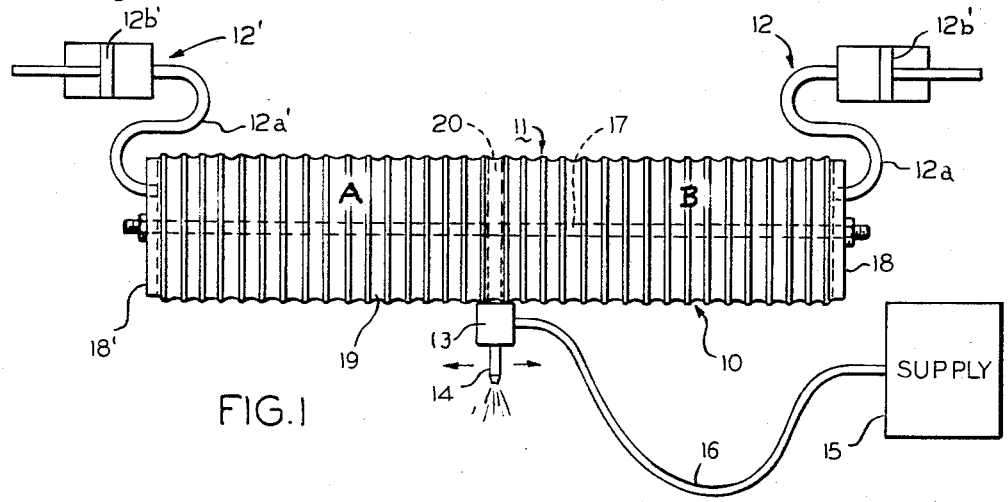
FIG. 1 is an elevational view, partly in schematic form, with hidden parts shown in dashed outline, of a reciprocating bellows apparatus constructed in accordance with the principles of the present invention adapted for use in mechanical paint spraying.

Referring to FIG. 1 there is depicted a reciprocating bellows apparatus constructed in accordance with the present invention and generally indicated by the numeral 10. The reciprocating bellows apparatus 10 forms part of a system, indicated by 11, which includes schematically depicted fluid pressure means generally indicated by 12, 12' and a working attachment 13. The system 11 functions to reciprocatingly move the working attachment 13 in the directions indicated by the arrows along an axis parallel to that of the reciprocating bellows apparatus 10.

In the depicted application of the invention the working attachment 13 is a paint spray including a nozzle 14 for spraying paint to an object placed below. The working attachment 13 is supplied from a paint supply 15, via a flexible hose 16, with a pressurized supply of paint.

The reciprocating bellows apparatus 10 includes a guiding member 17 which is in the form of a centrally extending rod coincident with the longitudinal central axis of the reciprocating bellows apparatus, and to which is affixed in sealing relation at either end two generally circular end plates 18, 18' to which are attached, respectively, one of a pair of fluid communication hoses 12a, 12a' which form part of the fluid pressure means 12, 12'. The hoses 12a, 12a' each pass through the respective end plates 18, 18' to communicate fluid pressure to the interior of the reciprocating bellows apparatus 10.

About the guiding members 17 and extending between the end plates 18, 18' is a transversely reinforced tubular hose 19. The hose 19 has a common longitudinal axis with the guiding rod 17. Within the tubular hose 19, extending transversely and dividing it into two compartments or chambers designated A and B, is a center plate 20 of a circular configuration. The plate 20 is slidably mounted on the guide means 17 by having a circular hole formed at its center sized to receive the rod 17 with small clearance.

Referring to both FIGS. 1 and 2, the overall operation of the system 11 and the reciprocating bellows apparatus 10 will now be explained. In FIG. 1 the fluid pressure in both compartments of the reciprocating bellows apparatus 10 as symbolized by the central positions of plungers 12b, 12b', while in FIG. 2 the fluid pressure in one chamber has been increased, and that the other has been decreased symbolized by the moved position of the plungers 12b, 12b'. The increase and decrease in fluid pressure communicated by the respective hoses 12a, 12a' through the respective end plates 18, 18' causes a longitudinal expansion of the chamber B enclosed by the bellows formed by the section between the end plate 18 and the center plate 20 of the reinforced tubular hose 19 and a corresponding decrease in the longitudinal extent of the bellows, enclosing the chamber A, formed by the section between the end plate 18' and the center plate 20 of the reinforced tubular hose 19.

Figure 2:
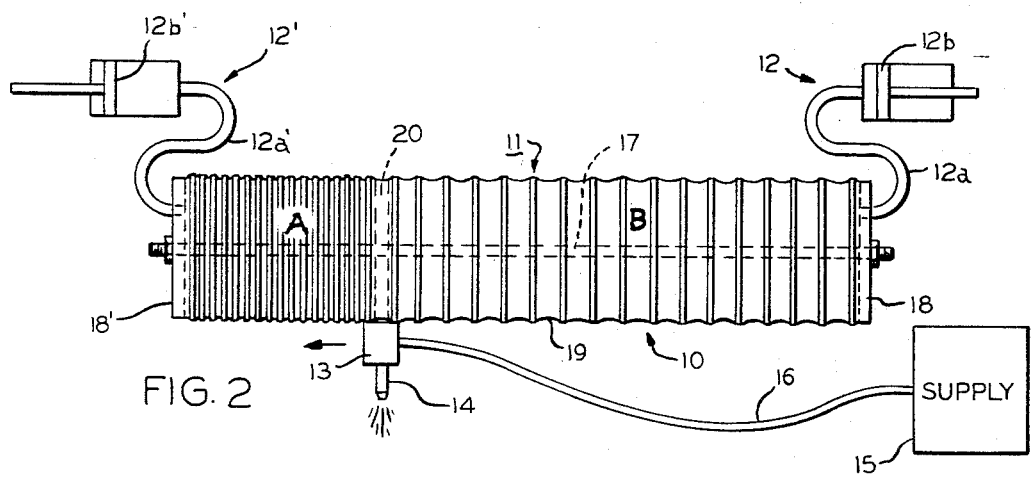
FIG. 2 is a view similar to FIG. 1 showing the reciprocating bellows apparatus in a moved position.

The paint spray working attachment 13, which is preferably affixed to an encircling clamping band formed about the outer surface of the tube or hose 19 at the position of the center plate 20, is caused to move from its position shown in FIG. 1 to that of FIG. 2 by the change in fluid pressure supplied from the fluid pressure means 12, 12'. The flexible paint hose 16 which extends from the supply 15 to the spray unit 13 is made sufficiently long so as to allow the unit 13 to freely travel. It should now be apparent that by proper operation or automatic programming of the fluid pressure means 12, 12' the working unit 13 may be positioned in any desired longitudinal position within a range about the center of the reciprocating bellows apparatus 10, and furthermore, by the proper variation of the fluid pressure communicated to the compartments or chambers A and B formed by the reciprocating bellows apparatus 10 that the working unit 13 may be caused to move back and forth or reciprocate longitudinally along the reciprocating bellows apparatus 10.

Figure 3:
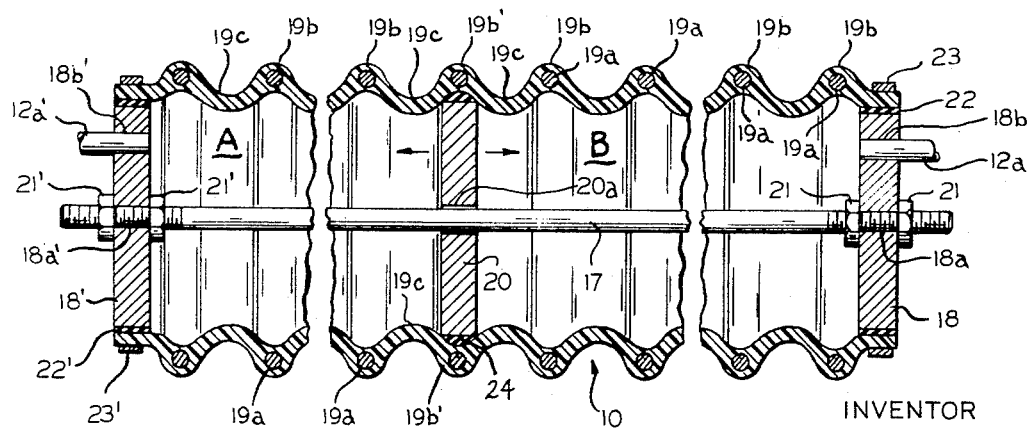
FIG. 3 is a longitudinal sectional enlarged elevational broken view of the reciprocating bellows apparatus shown in FIGS. 1 and 2 useful for illustrating the interior construction and operation of the apparatus.

Referring now to FIG. 3 there is depicted in greater detail the simple and economic construction of the reciprocating bellows apparatus 10 provided by the present vention.

The end plates 18, 18' may be of any suitable metal, disc shaped and prepared by boring a central hole 18a, 18a', for receiving the rod 17 and an off center hole 18b, 18b' for receiving the fluid pressure tubes 12a, 12a'. The holes 18a, 18a' and 18b, 18b' should be so sized as to snugly fit the received members so as to prevent fluid leakage. The ends of the rod 17 are threaded for a distance greater than the thickness of the end plates 18, 18' for allowing a pair of nuts 21, 21' to be threaded, one on either side of the respective end plates 18, 18', to firmly affix the end plates 18, 18' to the rod 17.

The interior end portions of the flexible transversely reinforced tubular hose 19 are affixed in about the outer curved edges of the end plates 18, 18' with annular shaped fluid seals 22, 22' sandwiched therebetween. The ends of the bellows forming hose 19 may be affixed to the end plates 18, 18' by means of a compression clamping ring 23, 23' encircling the outer surface of the hose 19, as shown, or in any other convenient method.

The central plate 20 may comprise a disc shaped metal member similar to the end plates 18 or 18' but without the opening for receiving the tubes 12a or 12a'. A centrally located hole 20a for fitting on the rod 17 should have sufficient clearance to allow it to slide along the rod 17. In some applications it may be desirable to provide an anti-friction bearing at the area of contact between the rod 17 and the center plate 20. The plate 20 is sized to fit transversely across the inside of the hose 19 and is preferably sealed therein against the interior surface of the hose 19 by a seal such as the seal 24.

The bellows hose 19 is formed of molded polyurethane or other flexible plastic material reinforced against excessive transverse expansion or contraction preferably by means of a plurality of longitudinally spaced encased annular metal rings or a continuous wire coil 19a, as shown, extending as a unitary member the entire length of the hose 19. The normal longitudinal cross-section shape of the molded material of the hose 19 is like a wave with the reinforcement at the outer crests 19b and flexible troughs 19c therebetween. The center plate 20 may be of such a size to be permanently affixed to a full pitch of the coil so as to provide a better seal, but this is not necessary and the depicted center plate 20 is adequate.

One particular type of plastic hose that may be used for the tubular hose 19 is constructed of neoprene impregnated with fiberglass and permanently sealed to a high tensile copper coated carbon steel wire coil coated with a resin. This particular hose is flame resistant, lightweight, highly compressible and has the rated ability to withstand working pressures of up to 50 pounds per square inch. This particular hose is commercially available under the trademark "Flexduct." It has the property of being compressible up to 25% of its original or normal length. A typical such hose would have a diameter of six inches and a normal length of 15 feet. Thus, when such a tubular hose is applied to reciprocating bellows apparatus according to the present invention a working unit travel of over eleven feet may be achieved.

Referring now to FIG. 4 there is depicted a reciprocating bellows apparatus designated 10', of the type constructed of a coil reinforced plastic tubular hose and employing air as its fluid, employed to open and close a rectangular sliding door 25 of the type that could be used for a household automobile garage. By increasing the air pressure supplied via a right fluid pressure line 12a and decreasing that supplied via a left fluid pressure line 12b the door 25 may be made to travel to the right. Reversing the process, the door may be made to return to its original position.

In FIG. 5 another application of a reciprocating bellows apparatus 10 in which a rectangular tank 26 having a liquid 27 with material in suspension is agitated by means of a reciprocating panel 28 partly immersed in the liquid 27. In this application a working unit 29 affixed to the reciprocating bellows apparatus 10 drives the agitating panel 28. By continuously cycling the fluid pressure applied to the apparatus 10, the panel 28 may be caused to reciprocate in the tank 26 and agitate the liquid 27.

Referring to FIG. 6, there is depicted a reciprocating bellows apparatus 10' of a different design. The reciprocating bellows apparatus 10' has a curved or arc guiding means or rod 17'. The rod 17' arcs at a constant rate of curvature and the center plate 20', as best shown in FIG. 6A, has a conformingly shaped passageway. If the rate of curvature is kept small, the reciprocating bellows apparatus 10' center plate 20' need not have a different configuration than that of the previous embodiment.

Referring to FIG. 7, there is illustrated a reciprocating bellows apparatus 10" for use in a confined space, such as the alcove formed by the wall members 30. In the embodiment, the guiding member or rod 17" extends in a straight line portion for the central approximately three quarters of its longitudinal extent and is curved in arc segments at its end areas, designated 31. This construction allows a linear travel for the working unit while minimizing the overall longitudinal dimension of the reciprocating bellows apparatus to only slightly more than the travel.

The above described reciprocating bellows apparatus has a distinct advantage over other fluid pressure operated apparatus, such as a piston and cylinder combination, in that as a permanent seal may be provided between the central plate 20 and the flexible tubular hose 19, and the working unit may be affixed about the hose 19 without an internal connection resulting in a much simpler structure with less leakage. Also, the energy lost through friction is small as the only moving pieces in frictional contact are the interior central plate 20 and the rod 17. The permanent seal between the inner surface of the tubular hose 19 and the central plate 20 materially reduces any fluid leakage between the compartments formed on either side of the center plate 20.

Having thus described my invention, what I claim and desire to secure by Letters Patent in the United States is:

1. Reciprocating bellows apparatus comprising:
   a flexible hollow hose;
   guide means internal of said hose for defining a path of travel for said hose;
   said hose having means defining two adjacent sealed compartments including a center plate means within said hose slidable on said guide means and sealingly fixed to said hose;
   said hose being adapted to have a working unit coupled thereto; and
   fluid pressure means for increasing and decreasing fluid pressure within the compartments formed within said hose, said fluid pressure means operating so as to increase fluid pressure in one of said compartments while decreasing fluid pressure in the other of said compartments; whereby said hose is caused to expand and contract along the path defined by said guide means so that said center plate means and said working unit coupled to said hose is caused to reciprocate.

2. A reciprocating bellows apparatus as defined in claim 1, as further characterized by having said flexible hose of a tubular shape and reinforced so as to limit transverse expansion.

3. The reciprocating bellows apparatus as defined in claim 2, in which said guide means includes a longitudinally extending rod, said flexible hose being mounted about and extending longitudinally therewith; said compartments are formed by a pair of end plates rigidly affixed to the ends of said rod and in sealed relation to the ends of the reinforced flexible tubular hose.

4. The reciprocating bellows apparatus as defined in claim 1 in which said flexible hose is formed from a plastic material and is reinforced by a wire coil.

5. The reciprocating bellows apparatus as defined in claim 3 in which said rod and said flexible reinforced tubular hose extends an arc segment for at least part of its extent.

6. The reciprocating bellows apparatus as defined in claim 5 in which said rod and said flexible reinforced tubular hose extend for said arc segment at only the ends of said longitudinally extending rod and extends for a straight portion in the center of said rod so that the working unit travels along said straight portion.

7. The reciprocating bellows apparatus as defined in claim 3 in which said end plates are of a disc-shaped configuration and each have an access hole for allowing a fluid pressure tube, comprising part of said fluid pressure means, for providing fluid pressure communication to each of said compartments and each of said end plates is affixed to said rod by having said rod extend through a centrally located hole with a pair of nuts affixed to said rod on opposite sides of each end plate.

8. The reciprocating bellows apparatus as claimed in claim 4 in which said plastic material is neoprene and said coil is formed of high tensile copper coated carbon steel wire and is encased in said plastic material.

9. The reciprocating bellows apparatus as defined in claim 7 in which said center plate is of a disc-like configuration and is slidably mounted on said rod by means of a central bore therethrough and is permanently affixed about its curving outer edge to a central segment of the interior surface of said reinforced flexible tubular hose.

10. The reciprocating bellows apparatus as defined in claim 9 in which said flexible tubular hose is formed from a plastic material and is reinforced by a wire coil of high tensile carbon steel encased therein.

11. The reciprocating bellows apparatus as claimed in claim 3, in which said rod is non-linear.

References Cited

UNITED STATES PATENTS

| | | | |
|---|---|---|---|
| 590,863 | 9/1897 | Severy | 92—39 X |
| 1,295,471 | 2/1919 | Fleury | 92—44 |
| 1,546,706 | 7/1925 | Bezzenberger | 92—44 |
| 2,041,916 | 5/1936 | Flint | 92—39 X |
| 2,101,735 | 12/1937 | Fonseca | 92—40 X |
| 2,124,735 | 7/1938 | Flint | 92—42 X |
| 2,292,527 | 8/1942 | Kraft | 92—44 X |
| 2,544,973 | 3/1951 | Alexanderson et al. | 92—39 |
| 2,609,177 | 9/1952 | Hughes | 92—34 X |
| 3,130,963 | 4/1964 | Stegner | 92—44 X |

FOREIGN PATENTS

| | | |
|---|---|---|
| 1,169,220 | 9/1958 | France. |

MARTIN P. SCHWADRON, *Primary Examiner.*

I. C. COHEN, *Assistant Examiner.*